United States Patent [19]
Wilson et al.

[11] Patent Number: 6,037,981
[45] Date of Patent: Mar. 14, 2000

[54] METHOD AND APPARATUS FOR USING DIGITAL TELEVISIONS AS REMOTE PERSONAL COMPUTER DISPLAYS

[75] Inventors: Andrew T. Wilson, Portland, Oreg.; Eric C. Hannah, Pebble Beach, Calif.

[73] Assignee: Intel Corporation, Santa Clara, Calif.

[21] Appl. No.: 09/146,082

[22] Filed: Sep. 2, 1998

[51] Int. Cl.[7] ........................................ H04N 7/18
[52] U.S. Cl. .................. 348/384; 348/390; 348/586; 348/552; 348/441; 370/465; 370/466; 370/467; 370/468; 386/97; 386/104; 395/327; 369/32
[58] Field of Search .................. 348/384, 390, 348/586, 552, 441, 731

[56] References Cited

U.S. PATENT DOCUMENTS

| | | | |
|---|---|---|---|
| 5,586,093 | 12/1996 | Honda et al. | 369/32 |
| 5,675,390 | 10/1997 | Schindler et al. | 348/552 |
| 5,706,290 | 1/1998 | Shaw et al. | 348/390 |
| 5,748,835 | 5/1998 | Lee | 386/104 |

OTHER PUBLICATIONS

"AirLink Pro PC/TV Remote Pro PC/TV 1 PSC–1106 MultiPro Plus," available at www.aitech.com/videoout.htm, Aug. 4, 1998. (2 pages).

"AirLink Pro PC/TV Remote Pro PC/TV 1 PSC–1106 MultiPro Plus: PC/TV AirLink," available at www.aitech-.com/airlink–details.htm, Aug. 4, 1998. (2 pages).

"AirLink Pro PC/TV Remote Pro PC/TV 1 PSC–1106 MultiPro Plus: Corporate Information," available at www.aitech.com/aboutusmain.htm, Aug. 4, 1998 (3 pages).

"AITech International World Headquarters," available at www.aitech.com/contactus.htm, Aug. 4, 1998. (1 pages).

*Primary Examiner*—Anand S. Rao
*Assistant Examiner*—Shawn S. An
*Attorney, Agent, or Firm*—Steve P. Skabrat

[57] ABSTRACT

Use of a digital television as a remote display for a computer system is accomplished by capturing video data signals, compressing the captured video data signals, capturing audio output data signals, converting the captured audio output data signals and captured video data signals into broadcast digital television data packets, and transmitting the television data packets as television signals to the digital television.

29 Claims, 4 Drawing Sheets

METHOD AND APPARATUS FOR USING DIGITAL TELEVISIONS AS REMOTE PERSONAL COMPUTER DISPLAYS

BACKGROUND

1. Field

The present invention relates generally to computer systems and more specifically to wireless communication from a computer to a digital display device.

2. Description

The technology and uses of computer systems, especially personal computers (PCs), and televisions are converging. Generally, a home PC is situated in a den, bedroom, or office and used to execute applications, such as word processing, financial spreadsheets, electronic mail, and World Wide Web (WWW) browsing, for example. The PC is also typically used by only one person at a time. A television, in contrast, is usually situated in the living room of a home and is typically used by one or more people at a time. The television is used primarily for news and entertainment purposes, with the television programs being provided by broadcast, cable, satellite, or video cassette recorder (VCR) signal sources.

In most desktop PCs, a computer monitor is physically attached by cables to the PC. Often these cables are only four to six feet long, ensuring that the monitor is situated in close proximity to the PC. This arrangement is practical and acceptable when a single user of the PC interacts with the PC's keyboard, mouse or other input device, and the monitor, by sitting at a desk or table that supports these devices. However, with the convergence of the PC and the television, new uses of the PC are possible. A PC situated in one room may be used to provide the display output data for a display device (such as a "big-screen" television, for example) situated in another room. Alternatively, the PC may be in the same room as the remote display device, but located at a greater distance away from the display device than can be easily or aesthetically serviced by cables. In either case, it would be desirable to transfer the audio and video output data of the PC to a remote display device such as a television, for example, in a widely acceptable and low cost manner without the use of cables or wires.

AITech, Inc., of Fremont, Calif., markets a wireless PC-to-TV scan converter that displays a PC's output data remotely on an analog television. The scan converter converts a PC's digital Video Graphics Adapter (VGA) output signals to National Television Standards Committee (NTSC) analog format and transmits the NTSC signal to a receiver unit that plugs into a standard analog television. However, this approach has several disadvantages. It requires independent transmitter and receiver units to be purchased by a consumer, is relatively expensive, and supports only one PC display resolution. Additionally, the image quality displayed on the analog television is severely degraded by the conversion to an analog format according to this technique.

What is needed is a method and apparatus for using digital televisions as remote PC displays which overcomes the disadvantages of previous analog technologies.

SUMMARY

An embodiment of the present invention is a method of using a digital television as a remote display for a computer system. The method includes capturing video data signals, compressing the captured video data signals, and capturing audio output data signals. The method further includes converting the captured audio output data signals and captured video data signals into broadcast digital television data packets, and transmitting the television data packets as television signals to the digital television. Another embodiment of the present invention is an apparatus for generating television signals for display on a remote digital television as display output for a computer system. The apparatus includes video capture and compression logic to capture video data signals and compress the captured video data signals, audio capture logic to capture audio output data signals, and audio and video data converter logic to convert the captured audio output data signals and captured video data signals into broadcast digital television data packets.

BRIEF DESCRIPTION OF THE DRAWINGS

The features and advantages of the present invention will become apparent from the following detailed description of the present invention in which.

DETAILED DESCRIPTION

In the following description, various aspects of the present invention will be described. For purposes of explanation, specific numbers, systems and configurations are set forth in order to provide a thorough understanding of the present invention. However, it will also be apparent to one skilled in the art that the present invention may be practiced without the specific details. In other instances, well known features are omitted or simplified in order not to obscure the present invention.

Embodiments of the present invention may be implemented in hardware or software, or a combination of both. However, embodiments of the invention may be implemented in computer programs executing on programmable computer systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion.

The computer programs may be implemented in a high level procedural or object oriented programming language to communicate with the computer system. The programs may also be implemented in assembly or machine language, if desired. In fact, the invention is not limited in scope to any particular programming language. In any case, the language may be a compiled or interpreted language.

The computer programs may be stored on a storage media or device (e.g., hard disk drive, floppy disk drive, read only memory (ROM), CD-ROM device, flash memory device, digital versatile disk (DVD), or other storage device) readable by a general or special purpose programmable computer system, for configuring and operating the computer system when the storage media or device is read by the computer system to perform the procedures described herein. Embodiments of the invention may also be considered to be implemented as a machine-readable storage medium, configured for use with a computer system, where the storage medium so configured causes the computer system to operate in a specific and predefined manner to perform the functions described herein.

Figure 1:
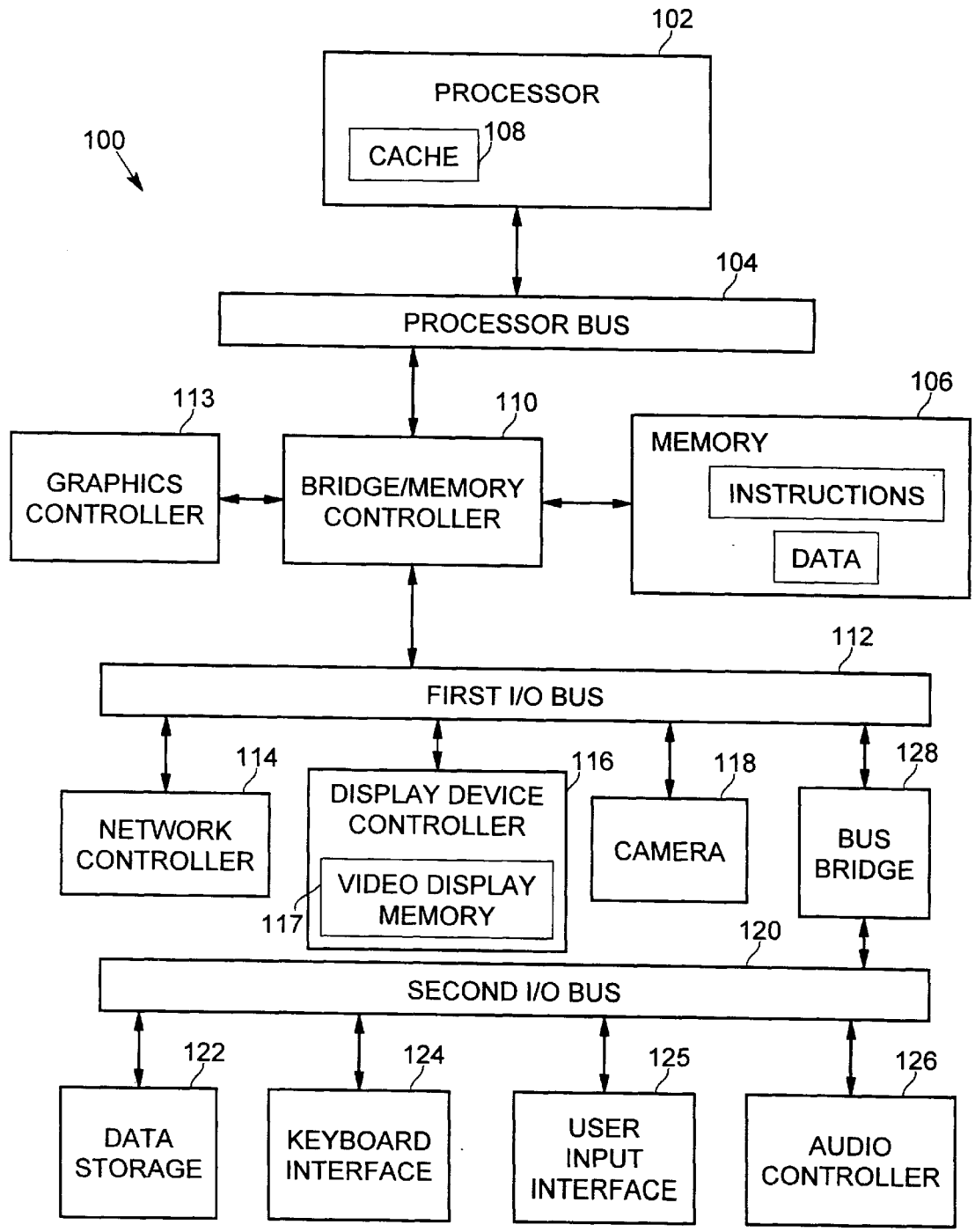
FIG. 1 is a diagram illustrating a sample computer system suitable to be programmed with a method of using a digital television as a remote PC display according to an embodiment of the present invention.

An example of one such type of computer system is shown in FIG. 1. Sample system 100 may be used, for example, to execute the processing for the methods described herein. Sample system 100 is representative of computer systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. In one embodiment, sample system 100 may be executing a version of the WINDOWS™ operating system available from Microsoft Corporation, although other operating systems and graphical user interfaces may also be used.

FIG. 1 is a diagram illustrating a sample computer system suitable to be programmed with a method of using a digital television as a remote PC display according to an embodiment of the present invention. The computer system 100 includes a processor 102 that processes data signals. The processor 102 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 1 shows an example of an embodiment of the present invention implemented on a single processor computer system 100. However, it is understood that embodiments of the present invention may be implemented in a computer system having multiple processors. The processor 102 may be coupled to a processor bus 104 that transmits data signals between processor 102 and other components in the computer system 100.

The computer system 100 includes a memory 106. The memory 106 may be a dynamic random access memory (DRAM) device, a static random access memory (SRAM) device, or other memory device. The memory 106 may store instructions and/or data represented by data signals that may be executed by the processor 102. The instructions and/or data comprise the code for performing any and/or all of the techniques of the present invention. The memory 106 may also contain additional software (not shown). A cache memory 108 may reside inside processor 102 that stores data signals stored in memory 106. The cache memory 108 speeds up memory accesses by the processor by taking advantage of its locality of access. Alternatively, the cache memory may reside external to the processor.

A bridge/memory controller 110 may be coupled to the processor bus 104 and the memory 106. The bridge/memory controller 110 directs data signals between the processor 102, the memory 106, and other components in the computer system 100 and bridges the data signals between the processor bus 104, the memory 106, and a first input/output (I/O) bus 112. In some embodiments, the bridge/memory controller provides a graphics port (e.g., an Accelerated Graphics Port (AGP)) for connecting to a graphics controller 113. The graphics controller 113 interfaces to a display device (not shown in FIG. 1) for displaying images rendered or otherwise processed by the graphics controller 113 to a user. Generally, the display device may be a television set (analog or digital), a computer monitor, a flat panel display, or other suitable display device. In embodiments of the present invention, the display device comprises a remotely located digital television.

The first I/O bus 112 may be a single bus or a combination of multiple buses. The first I/O bus 112 provides communication links between components in computer system 100. A network controller 114 may be coupled to the first I/O bus 112. The network controller links the computer system 100 to a network of computers (not shown in FIG. 1) and supports communication among various computer systems. The network of computers may be a local area network (LAN), a wide area network (WAN), the Internet, or other computer network. In some embodiments, a display device controller 116 may be coupled to the first I/O bus 112. The display device controller 116 allows coupling of a display device to the computer system 100 and acts as an interface between a display device (not shown in FIG. 1) and the computer system. The display device controller may be a monochrome display adapter (MDA) card, a color graphics adapter (CGA) card, an enhanced graphics adapter (EGA) card, an extended graphics array (XGA) card, or other display device controller card. The display device controller may comprise a video display memory 117. Generally, the display device may be a television set, a computer monitor, a flat panel display, or other suitable display device. In embodiments of the present invention, the display device comprises a remotely located digital television. The display device receives data signals from the processor 102 through the display device controller 116 and other components described below and displays information contained in the data signals to a user of the computer system 100.

Optionally, a camera 118 may be coupled to the first I/O bus. The camera 118 may be a digital video camera having internal digital video capture hardware that translates a captured image into digital graphical data. The camera may be an analog video camera having digital video capture hardware external to the video camera for digitizing a captured image. Alternatively, the camera 118 may be a digital still camera or an analog still camera coupled to image capture hardware.

A second I/O bus 120 may be a single bus or a combination of multiple buses. The second I/O bus 120 provides communication links between components in the computer system 100. A data storage device 122 may be coupled to the second I/O bus 120. The data storage device 122 may be a hard disk drive, a floppy disk drive, a CD-ROM device, a flash memory device, or other mass storage device. Data storage device 122 may comprise one or more of the described data storage devices.

A keyboard interface 124 may be coupled to the second I/O bus 120. The keyboard interface 124 may be a keyboard controller or other keyboard interface device. The keyboard interface 124 may be a dedicated device or may reside in another device such as a bus controller or other controller device. The keyboard interface 124 allows coupling of a keyboard to the computer system 100 and transmits data signals from a keyboard to the computer system 100. A user input interface 125 may be coupled to the second I/O bus 120. The user input interface may be coupled to a user input device such as a mouse, joystick, or trackball, for example, to provide input data to the computer system. An audio controller 126 may be coupled to the second I/O bus 120. The audio controller 126 operates to coordinate the recording and playback of audio signals. A bus bridge 128 couples the first I/O bridge 112 to the second I/O bridge 120. The bus bridge operates to buffer and bridge data signals between the first I/O bus 112 and the second I/O bus 120.

Embodiments of the present invention are related to the use of the computer system 100 to display data on a remotely located digital television. According to one embodiment, a method of using a digital television as a remote PC display may be performed by the computer system 100 in response to the processor 102 executing sequences of instructions in memory 104. Such instructions may be read into memory 104 from another computer-readable medium, such as data storage device 122, or from another source via the network controller 114, for example. Execution of the sequences of instructions by the processor 102 directs the display of data on a remotely located digital television, as will be described hereafter. In an alternative embodiment, hardware circuitry may be used in place of or in combination with software instructions to implement embodiments of the present invention. Thus, the present invention is not limited to any specific combination of hardware circuitry and software.

The elements of FIG. 1 perform their conventional functions well-known in the art. In particular, data storage device 122 may be used to provide long-term storage for the executable instructions for embodiments of methods for causing the display of data on a remotely located digital television in accordance with the present invention, whereas memory 106 is used to store on a shorter term basis the executable instructions of embodiments of such methods in accordance with the present invention during execution by processor 102.

Figure 2:
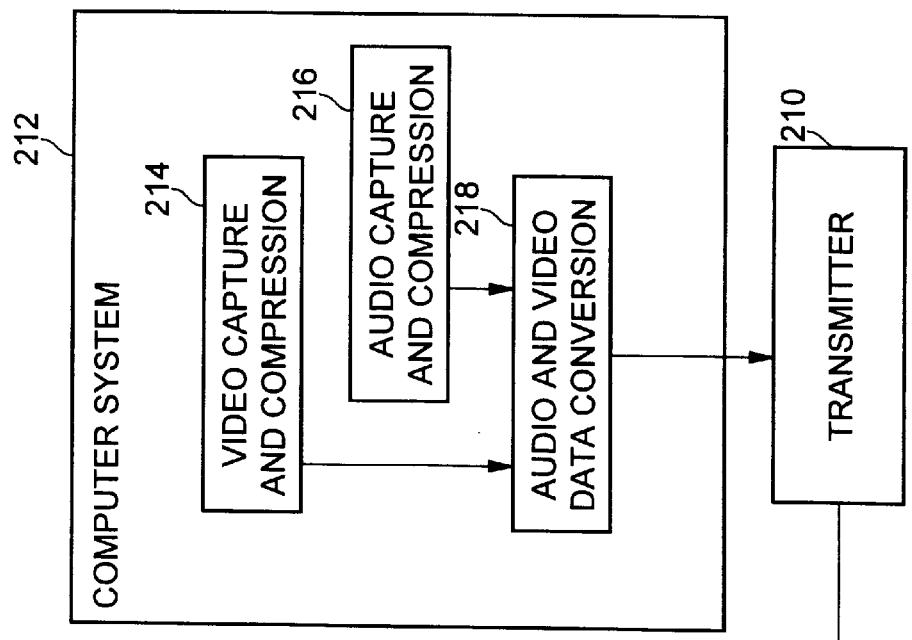
FIG. 2 is a diagram of components employed in using a digital television as a remote PC display according to an embodiment of the present invention.
Figure 2:
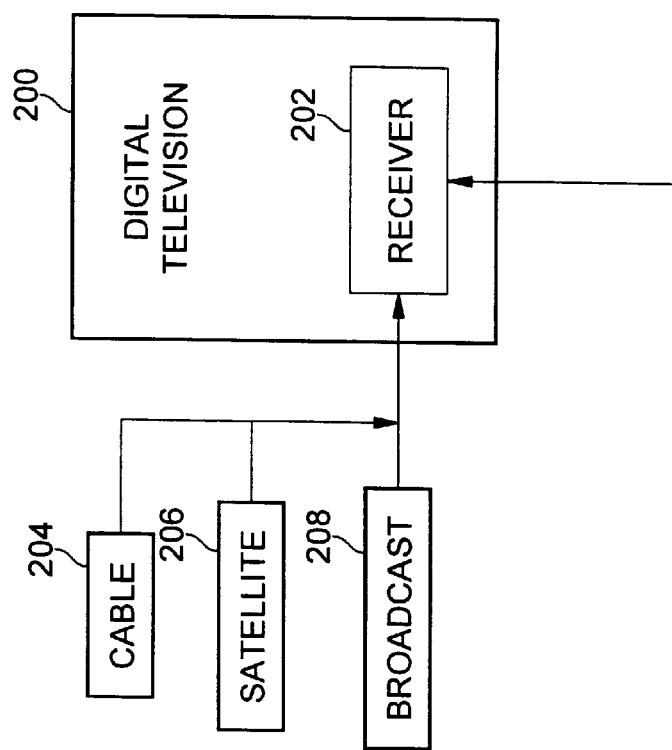

FIG. 2 is a diagram of components employed in using a digital television as a remote PC display according to an embodiment of the present invention. It is contemplated that a PC or similar device and a digital television are located in the same building (such as a home, for example) and perhaps even in the same room. In embodiments of the present invention, the television comprises a digital television 200 conforming to the Advanced Television Systems Committee (ATSC) Digital Television Standard (DTS), ATSC Document A/53 (1995), adopted on Dec. 24, 1996 by the United States Federal Communications Commission (FCC) and defining the major elements of the next generation of broadcast television technology, although the invention is not so limited in scope in this respect. The DTS describes the system characteristics of the advanced television (ATV) system. The DTS describes a system designed to transmit high quality video, audio, and ancillary data over a single 6 megahertz (MHz) channel. The DTS provides detailed specification of the parameters of the television system, including video encoder input scanning formats and pre-processing and compression parameters of a video encoder, the audio encoder input signal format and pre-processing and compression parameters of an audio encoder, the service multiplex and transport layer characteristics and normative specifications, and the vestigial sideband (VSB) radio frequency (RF)/transmission subsystem, although the invention is not limited in scope in this respect.

Digital television 200 comprises a receiver 202 for receiving the television signal to be converted into a picture for display to a user. Generally, the receiver 202 may receive the television signals from one of several sources, such as cable 204, satellite 206, or broadcast 208 technologies. In embodiments of the present invention, however, the receiver 202 receives a television signal broadcast by transmitter 210 coupled to a computer system 212. In one embodiment, the transmitter comprises an external device coupled to the computer system. In another embodiment, the transmitter 210 may be integral with the computer system 212. Transmitter 210 may be coupled with either first I/O bus 112 or second I/O bus 114 of the sample computer system of FIG. 1.

Computer system 212 comprises at least three components for generating output data for remote display on a digital television: video capture and compression unit 214, audio capture and compression unit 216, and audio and video data conversion unit 218. These components may be implemented in either software or hardware or a combination of software and hardware.

In an embodiment of the present invention, video capture and compression unit 214 is a program executed by the processor 102 of the computer system which captures updates to the computer system's video display memory and compresses those updates in Motion Picture Experts Group (MPEG-2) format. MPEG-2 refers to International Organization for Standardization (ISO)/International Electrotechnical Commission (IEC) standards 13818-1 (Systems), 13818-2 (Video), 13818-3 (audio), and 13818-4 (Compliance). The digital television system employs the MPEG-2 video stream syntax for the coding of video data signals. Video capture and compression refers to the capture of video display memory updates as well as bit rate reduction methods (also known as data compression) for application to the captured digital video data streams. Video encoding within the video capture and compression unit 214 implements the MPEG-2 Main Profile. The Main Profile includes three types of frames for prediction (I-frames, P-frames, and B-frames), and an organization of luminance and chrominance samples with each frame. Video compression within video capture and compression unit 214 takes a video source signal (e.g., data from the video display memory of the computer system) and outputs a compressed digital signal that contains information that can be decoded to produce at least an approximate version of the original image sequence.

In another embodiment, the video data signals may be obtained from a digital versatile disk (DVD) device (represented as data storage 122 in FIG. 1) or other video data source coupled to the computer system.

Figure 3:
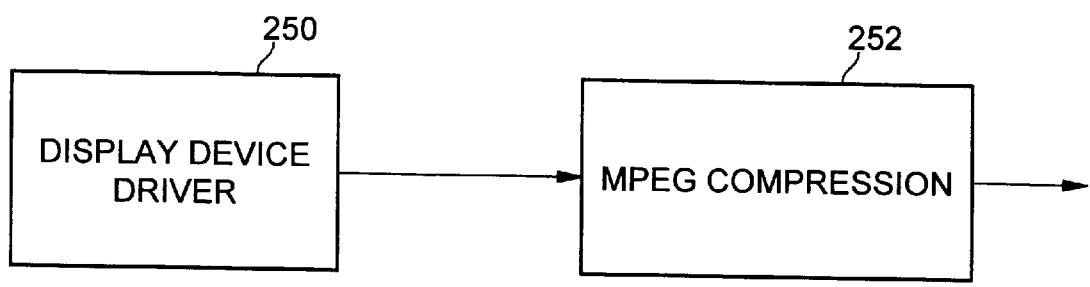
FIG. 3 is a diagram of capturing updates to a video display according to an embodiment of the present invention.

In another embodiment, video data may be captured by video capture and compression unit 214 as the data signals are being stored in video display memory 117, thereby avoiding execution of the motion estimation phase of MPEG compression processing. FIG. 3 is a diagram of capturing updates to a video display according to an embodiment of the present invention. In FIG. 3, display device driver software 250 being executed by processor 102 accepts calls from operating system software (not shown) to display changes to a video frame. As display device driver software implements these changes in video display memory (117 of FIG. 1), display device driver forwards only these changes to MPEG compression software 252, which compresses the update data signals. The compressed video update data signals may then be forwarded to audio and video data conversion unit 218 before motion estimation processing is performed by MPEG compression software 252, thereby providing significant advantages in overall system bandwidth.

In an embodiment of the present invention, audio capture and compression unit 216 is a program executed by the processor 102 of the computer system which captures the computer system's audio output stream and (optionally) compresses the audio output stream according to the Digital Audio Compression (AC-3) standard. The AC-3 standard (ATSC Document A/52, Advanced Television Standards Committee, 1995) specifies the coded representation of audio information and the decoding process, as well as information on the encoding process. This coded representation may be suitable for use in digital audio transmission and storage applications, and may convey one to five full bandwidth audio channels, along with a low frequency enhancement channel.

In an embodiment of the present invention, audio and video data conversion unit 218 divides the digital audio and video data streams into packets of information, identifies each packet, and multiplexes the video data stream packets and the audio data stream packets into a single stream of television data packets. In one embodiment of the present invention, the well-known MPEG-2 transport stream syntax is employed for the packetization and multiplexing of video, audio, and data signals for digital broadcasting systems.

The single data stream may be communicated to transmitter 210 for transmission to receiver 202 of digital television 200. The transmitter may radio frequency (RF) modulate the television data packets as a low power television signal suitable for local reception by receiver 202 of digital television 200. The transmitter may comprise channel coding and modulation (not shown). A channel coder takes the data stream and adds additional information that can be used by the receiver 202 to reconstruct the data from the received signal which, due to transmission impairments, may not perfectly accurately represent the transmitted signal. The modulation employs the digital data stream information to modulate the transmitted signal.

In one embodiment of the present invention, the digital audio and video data streams may be stored in data storage 122 of the computer system 212 for transmission by transmitter 210 to the digital television 200 at a later point in time. This embodiment may prove useful for allowing a user to deliver presentations or address technical support issues by displaying the computer system's display output data on the digital television under the temporal control of the user. The storage may be employed either before or after conversion of the data signals by audio and video data conversion 218.

In another embodiment of the present invention, video capture and compression unit 214, audio capture and compression unit 216, and audio and video data conversion may be implemented as logic within display device controller 116, thereby providing digital television output data signals from the display device controller component within computer system 212.

Figure 4:
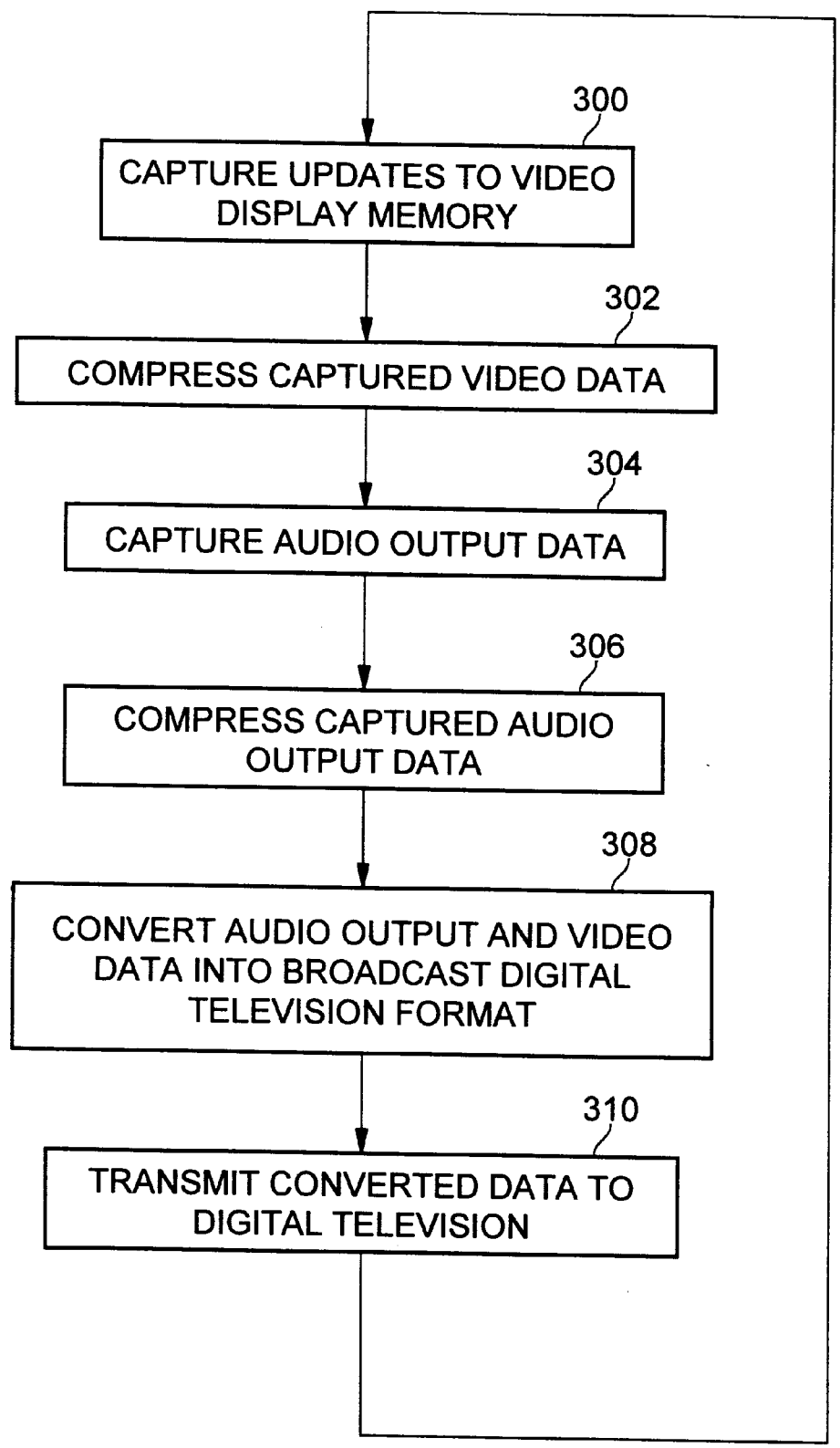
FIG. 4 is a flow diagram of processing data to support a remote PC display according to an embodiment of the present invention.

FIG. 4 is a flow diagram of processing data to support a remote PC display according to an embodiment of the present invention. At block 300, updates to the computer system's video display memory may be captured. These updates represent the picture to be displayed to the user of the computer system. Alternatively, the video data signals may be obtained from another component within the computer system, such as a digital versatile disk (DVD) device coupled to the first or second I/O bus, for example. At block 302, the captured video data signals may be compressed according to the well-known MPEG-2 format. At block 304, the audio output data stream of the computer system may be captured. At block 306, the captured audio output data signals may be compressed according to the well-known AC-3 format. Next, at block 308, the audio output data signals and the compressed video data signals may be converted into a broadcast digital television format (for example, the Digital Television Standard). The converted data signals may then be transmitted to a digital television at block 310. For example, a particular television channel which is unused by commercial television broadcasting in the user's vicinity may be selected for use as the real-time display channel of the computer system in embodiments of the present invention. The converted data may be broadcast over-the-air on the selected television channel. Alternatively, after block 308 the audio and video data streams may be stored for later use either before or after conversion.

Embodiments of the present invention may be useful in providing remote display capabilities for a PC situated in an office or a bedroom when the digital television is situated in the living room of a house, for example. In another example, an embodiment of the present invention may be used by a mobile or hand-held PC to display output data in a room equipped with a digital television but not a high resolution computer monitor (e.g., in a hotel room or conference room).

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of using a digital television as a remote display for a computer system comprising:
    capturing digital video data signals generated by the computer system while the digital video data signals are being stored in a video display memory and prior to motion estimation processing in the computer system;
    compressing the captured digital video data signals;
    capturing digital audio output data signals generated by the computer system;
    converting the captured digital audio output data signals and the captured digital video data signals into broadcast digital television data packets; and
    transmitting the broadcast digital television data packets as television signals from the computer system to the digital television.

2. The method of claim 1, wherein capturing digital video data signals comprises capturing digital video data signals from a video display memory of the computer system.

3. The method of claim 1, further comprising compressing the captured digital audio output data signals.

4. The method of claim 1, wherein transmitting the television data packets comprises broadcasting the digital television data packets.

5. The method of claim 1, wherein compressing the captured digital video data signals comprises representing the captured digital video data signals according to MPEG-2 format.

6. The method of claim 1, wherein capturing the digital audio output data signals comprises representing the captured digital audio output data signals according to AC-3 format.

7. The method of claim 1, further comprising storing the captured audio output and digital video data signals.

8. In a computer system, an apparatus for generating television signals for display on a remote digital television as display output for the computer system comprising:
    video capture and compression logic to capture digital video data signals and compress the captured digital video data signals, wherein the digital video data signals comprise updates to a video display and the video capture and compression logic captures the digital video data signals prior to motion estimation processing of the digital video data signals;

audio capture logic to capture digital audio output data signals; and audio and video data converter logic to convert the captured digital audio output data signals and captured digital video data signals into broadcast digital television data packets.

9. The apparatus of claim 8, further comprising a transmitter to transmit the broadcast digital television data packets as television signals to the digital television.

10. The apparatus of claim 9, wherein the transmitter comprises a broadcaster to broadcast the digital television signals over a television channel.

11. The apparatus of claim 8, further comprising a video display memory to provide the digital video data signals.

12. The apparatus of claim 8, further comprising audio compression logic to compress the captured digital audio output data signals.

13. The apparatus of claim 8, wherein the compressed digital video data signals are represented according to MPEG-2 format.

14. The apparatus of claim 8, wherein the digital audio output data signals are represented according to AC-3 format.

15. In a computer system, a system to generate television signals for display on a remote digital television as display output for the computer system comprising:

means for capturing digital video data signals, wherein the digital video data signals comprise updates to a video display and the video capture means captures the digital video data signals prior to motion estimation processing of the digital video data signals;

means for compressing the captured digital video data signals;

means for capturing digital audio output data signals; and means for converting the captured digital audio output data signals and captured video data signals into broadcast digital television data packets.

16. The system of claim 15, further comprising means for transmitting the broadcast digital television data packets as television signals to the digital television.

17. The system of claim 15, further comprising means for compressing the captured digital audio output data signals.

18. An article comprising:

a machine readable medium having a plurality of machine readable instructions, wherein when the instructions are executed by a processor the instructions cause a system to capture digital video data signals from a component of a computer system, wherein the digital video data signals comprise updates to a video display and the instructions cause the capture of the digital video data signals prior to motion estimation processing of the digital video data signals, to compress the captured digital video data signals, to capture digital audio output data signals, and to convert the captured digital audio output data signals and captured digital video data signals into broadcast digital television data packets.

19. The article of claim 18, further comprising instructions to cause the system to transmit the broadcast digital television data packets as television signals to a digital television.

20. The article of claim 18, further comprising instructions to compress the captured digital audio output data signals.

21. A system comprising:

a digital television;

a computer system, the computer system comprising video capture and compression logic to capture digital video data signals from a component of the computer system and compress the captured digital video data signals, wherein the digital video data signals comprise updates to a video display and the video capture and compression logic captures the digital video data signals prior to motion estimation processing of the digital video data signals;

audio capture logic to capture digital audio output data signals generated by the computer system; and audio and video data converter logic to convert the captured digital audio output data signals and captured digital video data signals into broadcast digital television data packets; and a transmitter to transmit the broadcast digital television data packets as television signals to the digital television.

22. The system of claim 21, wherein the transmitter broadcasts the digital television data packets as television signals to the digital television over an over-the-air television channel.

23. The system of claim 21, wherein the component is a video display memory.

24. The system of claim 21, wherein the component is a digital versatile disk (DVD) device.

25. A display device controller within a computer system for generating television signals for display on a remote digital television as display output for the computer system comprising:

video capture and compression logic to capture digital video data signals and compress the captured digital video data signals, wherein the digital video data signals comprise updates to a video display and the video capture and compression logic captures the digital video data signals prior to motion estimation processing of the digital video data signals;

audio capture logic to capture digital audio output data signals; and audio and video data converter logic to convert the captured digital audio output data signals and captured digital video data signals into broadcast digital television data packets.

26. The display device controller of claim 25, further comprising a transmitter to transmit the broadcast digital television data packets to the digital television.

27. The method of claim 1, wherein the broadcast television data packets conform to the advanced television systems committee (ATSC) digital television standard (DTS).

28. The method of claim 1, wherein capturing digital video data signals comprises capturing updates to a video display memory of the computer system.

29. The apparatus of claim 8, wherein the broadcast television data packets conform to the advanced television systems committee (ATSC) digital television standard (DTS).

* * * * *